United States Patent
Ishii et al.

(10) Patent No.: US 11,363,132 B2
(45) Date of Patent: Jun. 14, 2022

(54) INFORMATION PROCESSING TERMINAL AND AUTOMATIC RESPONSE METHOD

(71) Applicant: Maxell, Ltd., Kyoto (JP)

(72) Inventors: Hirokazu Ishii, Kyoto (JP); Tomonori Nomura, Kyoto (JP); Akira Ishiyama, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 16/500,453

(22) PCT Filed: Apr. 20, 2017

(86) PCT No.: PCT/JP2017/015879
§ 371 (c)(1),
(2) Date: Oct. 3, 2019

(87) PCT Pub. No.: WO2018/193575
PCT Pub. Date: Oct. 25, 2018

(65) Prior Publication Data
US 2020/0195773 A1    Jun. 18, 2020

(51) Int. Cl.
*H04L 51/02* (2022.01)
*H04M 1/72484* (2021.01)
*H04M 1/72457* (2021.01)

(52) U.S. Cl.
CPC ........ *H04M 1/72484* (2021.01); *H04L 51/02* (2013.01); *H04M 1/72457* (2021.01); *H04M 2250/10* (2013.01)

(58) Field of Classification Search
CPC .............. H04L 51/02; H04M 2250/10; H04M 1/72572; H04M 1/72597
See application file for complete search history.

(56) References Cited

U.S. PATENT DOCUMENTS 7,056,217 B1 *  6/2006  Pelkey .................... A63F 13/12
                                                            463/25
9,432,944 B1 *  8/2016  Benegal ............ H04W 52/0277
(Continued)

FOREIGN PATENT DOCUMENTS

JP        2000-295669 A        10/2000
JP        2003-047032 A         2/2003
(Continued)

OTHER PUBLICATIONS

Oct. 22, 2019 International Preliminary Report on Patentability issued in International Patent Application No. PCT/JP2017/015879.
(Continued)

*Primary Examiner* — Jinsong Hu
*Assistant Examiner* — Farideh Madani
(74) *Attorney, Agent, or Firm* — Oliff PLC

(57) ABSTRACT

The information processing terminal that performs automatic response, comprises: a database configured to store personal information of a user of the information processing terminal; a receiver configured to receive an access and a message from an access partner; an automatic response unit configured to, after receiving the access, perform a request to the access partner to transmit the message when an operation in response to the access is not input in the information processing terminal, and create a response to the message which has been received in response to the request; and a transmitter configured to transmit the response to the access partner, wherein the automatic response unit includes: an intention recognition unit configured to recognize an intension of the message; and a response creation unit configured to create a response to the message by referring to the intension of the message and the personal information.

10 Claims, 12 Drawing Sheets

(56) References Cited

U.S. PATENT DOCUMENTS

| | | | |
|---|---|---|---|
| 2002/0093434 A1 | 7/2002 | Yoshioka et al. | |
| 2003/0022676 A1 | 1/2003 | Nakamoto et al. | |
| 2010/0250682 A1* | 9/2010 | Goldberg | H04L 51/34 |
| | | | 709/206 |
| 2012/0064924 A1* | 3/2012 | Schapsis | H04L 67/325 |
| | | | 455/466 |
| 2014/0253666 A1* | 9/2014 | Ramachandran | H04M 3/4872 |
| | | | 348/14.06 |
| 2020/0382635 A1* | 12/2020 | Vora | H04M 3/42042 |

FOREIGN PATENT DOCUMENTS

| | | |
|---|---|---|
| JP | 2007-173935 A | 7/2007 |
| JP | 2009-194619 A | 8/2009 |
| JP | 2010-232856 A | 10/2010 |
| JP | 2016-512673 A | 4/2016 |
| WO | 2014/164304 A1 | 10/2014 |

OTHER PUBLICATIONS

Jul. 18, 2017 Search Report issued in International Patent Application No. PCT/JP2017/015879.

May 19, 2020 Office Action issued in Japanese Patent Application No. 2019-513157.

Aug. 26, 2021 Office Action issued in Japanese Patent Application No. 2020-204711.

* cited by examiner

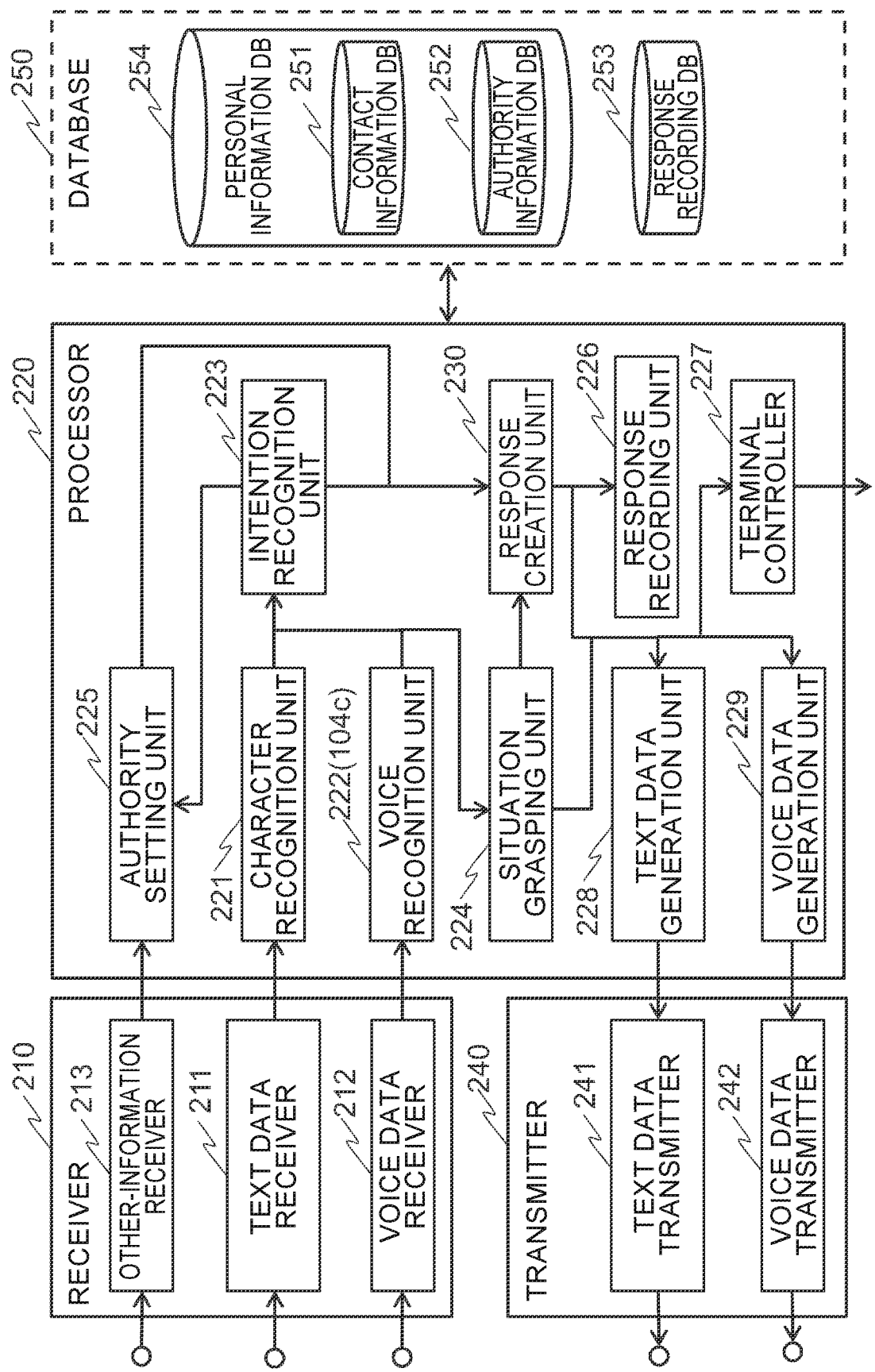

FIG. 5

| NAME | CATEGORY | | | BIRTH DATE | PASSWORD | ID INFORMATION | | | |
|---|---|---|---|---|---|---|---|---|---|
| | BELONGING | IMPORTANCE | TYPE | | | TELEPHONE NUMBER | E-MAIL ADDRESS | APPLICATION A ID | APPLICATION B ID |
| SATO A | | | MYSELF | Z DAY OF Y MOTH X YEAR | xxxx | xxx10 | yyyy10 | Aaa | Baa |
| SATO B | | | FAMILY | Z DAY OF Y MOTH X YEAR | | xxx11 | yyyy11 | Abb | Bbb |
| SATO C | | | FAMILY | Z DAY OF Y MOTH X YEAR | | xxx12 | yyyy12 | Acc | Bcc |
| KATO A | CLUB | | FRIEND | | | xxx20 | yyyy20 | Add | Bdd |
| SUDO A | PART-TIME JOB | | FRIEND | | | xxx21 | yyyy21 | Aee | Bee |
| SALES DEPARTMENT | COMPANY A | | COMPANY | | | xxx30 | yyyy30 | | |
| SUPERIOR A | COMPANY A | ○ | COMPANY | | | xxx31 | yyyy31 | | |
| CUSTOMER B | COMPANY B | | COMPANY | | | xxx40 | yyyy40 | | |
| MANAGER B | COMPANY B | ○ | COMPANY | | | xxx41 | yyyy41 | | |
| REPRESENTATIVE | HOSPITAL A | | MEDICAL | | | xxx50 | yyyy50 | | |
| DOCTOR A | HOSPITAL A | ○ | MEDICAL | | | xxx51 | yyyy51 | | |
| EMERGENCY | | | EMERGENCY | | zzzz | eeee | abcabc | | |
| X INVENTMENT COMPANY | | | UNSOLICITED | | | ffff | xyzxyz | | |

| CATEGORY | | | PROPRIETY INFORMATION | | | | | |
|---|---|---|---|---|---|---|---|---|
| TYPE | BELONGING | IMPORTANCE | LOCATION | SHEDULE CONFIRMATION | APPOINTMENT | PERSONAL INFORMATION | HEALTH INFORMATION | EMERGENCY PROCESSING |
| MYSELF | | | ○ | ○ | ○ | ○ | ○ | |
| FAMILY | | | ○ | ○ | ○ | | ○ | |
| FRIEND | CLUB | | ○ | ○ | ○ | | | |
| FRIEND | PART-TIME JOB | | ○ | | | | | |
| COMPANY | COMPANY A | | | ○ | | | | |
| COMPANY | COMPANY A | ○ | ○ | ○ | ○ | | | |
| COMPANY | COMPANY B | | | ○ | | | | |
| COMPANY | COMPANY B | ○ | | ○ | ○ | | | |
| MEDICAL | HOSPITAL A | | ○ | | | | ○ | |
| EMERGENCY | | | ○ | | | | | ○ |
| UNKNOWN | | | | | | | | |

# INFORMATION PROCESSING TERMINAL AND AUTOMATIC RESPONSE METHOD

TECHNICAL FIELD

The present invention relates to automatic response technology for information processing terminals, and more particularly, to the automatic response technology in which response contents can be automatically created and transmitted in accordance with an attribute of an access partner and contents of an access.

BACKGROUND ART

In recent years, due to the spread of information processing terminals such as mobile phones, smart phones, and tablet terminals, an environment capable of easily communicating is available. Generally, a user always carries an information processing terminal, namely, a mobile phone, a smart phone, a tablet terminal, etc. Meanwhile, there is a case where, when having received an access from someone (specifically, incoming call, message reception in a text chat, e-mail reception, etc.), the user cannot respond thereto. For example, for safety reasons or under social standard, the user cannot operate the information processing terminal during such as driving, meetings, working, or attending lectures, nor perform voice conversation such as during using public transportation, at the midnight, or in a place where privacy cannot be protected. In such a case, when the access is by voice, the user has utilized an automatic answering telephone function. The automatic answering telephone function is configured to uniformly respond to an access partner and record a received message regardless of who the access partner is or what the purpose of the access is. In recent years, the following techniques have evolved from the automatic answering telephone function.

There is an IP telephone device that performs response operations in accordance with each caller. The Patent Literature 1 discloses "the IP telephone device is configured to associate an address of a calling terminal which is a target for an automatic response operation with the kind of a response operation which will be performed after automatically establishing a session in response to reception of an INVITE message from the address, so as to store it in a storage of the IP telephone device as an automatic response setting. Upon receiving an INVITE message from a calling terminal through an IP network, the IP telephone device collates the address of the calling terminal which is received with the INVITE message with addresses included in the automatic response setting, and when the calling address is included in the automatic response setting, establishes a session without waiting for an off-hook operation, and performs a response operation in accordance with the kind of the response operation associated with the calling address" (excerpted from the Abstract).

Non Patent Literature 1 discloses the technique in which, upon receiving an e-mail, a mail server automatically replies thereto. Furthermore, according to this technique, it is possible to change contents in a reply mail depending on whether an address of a transmission source of the e-mail is within or outside of an organization of a user.

CITATION LIST

Patent Literature

Patent Literature 1: JP 2007-173935 A

Non Patent Literature

Non Patent Literature 1: "Send Automatic out of office replies from Outlook", [online], [retrieved on Mar. 28, 2017]<URL: https://Support.office.com/en-us/article/Send-automatic-out-of-office-replies-from-Outlook-9742f476-5348-4f9f-997f-5e208513bd67>

SUMMARY OF INVENTION

Technical Problem

However, the technique described in Patent Literature 1 is merely configured to reply by associating an access source with a response operation in one-to-one relation. Furthermore, the technique described in Non Patent Literature 1 is merely configured to classify access sources into two types as compared with the technique of Patent Literature 1. In both cases, it is necessary for a user to register response operations for each calling address or each access source, and accordingly, a complicated procedure is required for the user.

Furthermore, in the technique described in Non Patent Literature 1, the access sources are classified into two types, and accordingly, even when receiving an access from a person having an unauthorized purpose, information (as a main object of the technique described in Non Patent Literature 1, information indicating that the user is absent) is unnecessarily provided thereto. On the other hand, if setting not to respond to accesses from outside of an organization in order to prevent the above, information cannot be provided to people outside of the organization. In this way, it is not possible to cope with situations flexibly. Furthermore, since the technique described in Non Patent Literature 1 is basically for notifying an access partner that the user is absent, no responses are made for the second and subsequent accesses. However, the reasons why the second and subsequent accesses are made may be different from that of the first time, and thus the purposes and conditions for utilizing the technique described in Non Patent Literature 1 are limited.

The objective of the present invention is to provide the technique for automatically transmitting an appropriate response to an access partner in accordance with a situation with taking account of an attribute of an access source, access contents, and a situation of a user or information processing terminal, without requiring the user to perform a complicated procedure.

Solution to Problem

In order to solve at least one of the problems above, the present invention provides a means for automatically generating response contents in accordance with a purpose of access contents, with taking account of the access contents received from an access partner and a situation of a user or information processing terminal.

Furthermore, in order to solve at least one of the problems above, the present invention provides a means for automatically generating response contents in accordance with a purpose of access contents, by classifying access partners and setting authority for each type.

Still further, in order to solve at least one of the problems above, the present invention provides a means for automatically generating response contents in accordance with a purpose of access contents, taking account of the above-mentioned type of the access partner, access contents, and a situation of the user or information processing terminal.

Other specific matters according to the present embodiment are included in the embodiment and drawings.

Advantageous Effects of Invention

With the technique according to the present invention, it is possible to automatically transmit an appropriate response to an access partner in accordance with a situation with taking account of an attribute of an access source, access contents, and a situation of a user or information processing terminal, without requiring a user to perform a complicated procedure. The problems to be solved, configurations, and advantageous effects other than those described above will be clarified in the embodiments described below.

BRIEF DESCRIPTION OF DRAWINGS

FIG. 4 is a functional block diagram of an automatic response unit according to an embodiment of the present invention.

FIG. 5 is an explanatory drawing for explaining a contact information DB according to an embodiment of the present invention.

FIG. 6 is an explanatory drawing for explaining an authority information DB according to an embodiment of the present invention.

DESCRIPTION OF EMBODIMENTS

Hereinafter, examples of an embodiment according to the present invention will be explained using the drawings. The embodiment described below is one of the examples for achieving the present invention, and depending on configurations of apparatus to which the present invention is applied and various conditions, the present invention should be appropriately corrected or modified in a range without deviating from the significance of the present invention but not be limited to the following embodiment.

The information processing terminal according to the present embodiment is configured to automatically create a response in accordance with a situation and transmit the response when a user thereof cannot respond to an access from an access partner. Upon receiving a message from the access partner in response thereto, the information processing terminal performs processing in accordance with the received message, and automatically creates and transmits a further response. Hereinafter, an information processing terminal 100 according to the present embodiment which realizes the processing above will be described.

Figure 1:
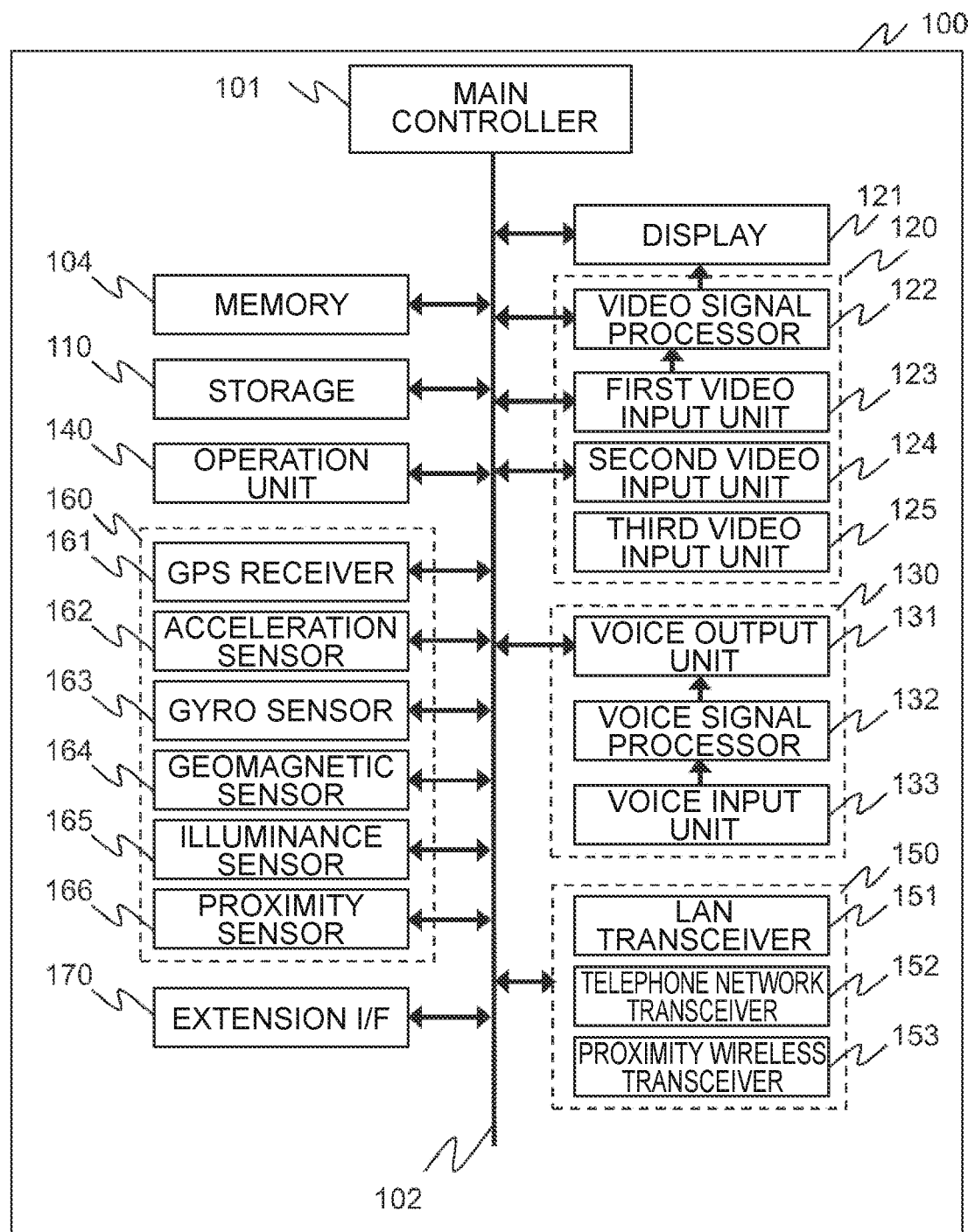
FIG. 1 is a block diagram of an information processing terminal according to an embodiment of the present invention.
Figures 2A, 2B:
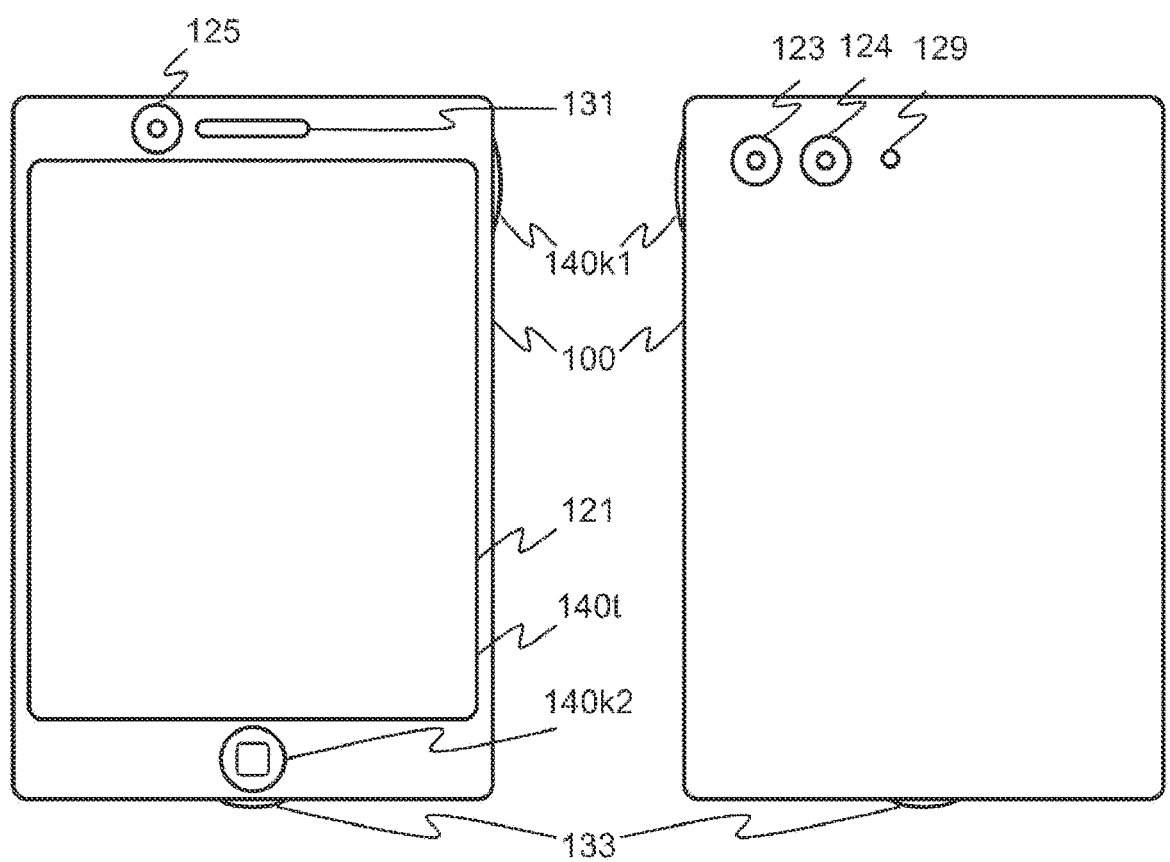
FIG. 2A and FIG. 2B are external views of an information processing terminal according to an embodiment of the present invention.

FIG. 1 illustrates a block diagram of the information processing terminal 100 according to the present embodiment. FIG. 2A and FIG. 2B illustrate external views of the information processing terminal 100 according to the present embodiment. The external view of FIG. 2A and FIG. 2B illustrate examples in which the information processing terminal 100 is an information processing terminal device such as a smart phone, and FIG. 2A illustrates a front surface of the information processing terminal 100 and FIG. 2B illustrates a back surface (behind) of the information processing terminal 100. FIG. 2A and FIG. 2B omit to illustrate the left, right, top, and bottom surface thereof.

As illustrated in FIG. 1, the information processing terminal 100 includes a main controller 101, a system bus 102, memory 104, a storage 110, a video processor 120, a voice processor 130, an operation unit 140, a communication processor 150, a sensor 160, and an extension interface 170.

The information processing terminal 100 may be an information processing device capable of transmitting and receiving data bidirectionally with another device, for example, which may be a mobile phone, a smart phone, and a tablet terminal. As other examples, it may be a PDA (Personal Digital Assistants), a PC (Personal Computer), or a digital camera. Furthermore, it may be a video camera capable of photographing a moving picture, a portable game machine, or other portable digital devices. Hereinafter, a smart phone will be described as an example of the present embodiment.

The main controller 101 is a microprocessor unit that controls the whole of the information processing terminal 100 in accordance with a predetermined program. The system bus 102 is a data communication path for performing data transmission/reception between the main controller 101 and each part within the information processing terminal 100.

The memory 104 is a program area during execution of a basic operation program and other application programs. Additionally, the memory 104 is a temporary storage area which stores data as necessary during execution of various application programs. The memory 104 may be integral with the main controller 101.

The storage 110 stores such as each operation setting value of the information processing terminal 100 and information of a user of the information processing terminal 100. The storage 110 may store still picture data and moving picture data captured by the information processing terminal 100. In this connection, the information processing terminal 100 is configured such that the function can be extended by downloading a new application program from an application server through the Internet. At this time, the downloaded new application program is stored in the storage 110. The main controller 101 develops the new application program stored in the storage 110 on the memory 104 and executes the program so that the information processing terminal 100 can realize various new functions.

The storage 110 needs to hold the stored information even in a state where no power is supplied to the information processing terminal 100. Accordingly, devices such as a flash ROM, a SSD (Solid State Drive), and a HDD (Hard Disk Drive) are used.

A display 121 is a display device such as a liquid crystal panel, and provides a user of the information processing terminal 100 with video data processed by a video signal processor 122.

The video processor 120 includes the video signal processor 122 as well as a first video input unit 123, a second video input unit 124, and a third video input unit 125. The video signal processor 122 processes video images acquired by each of the video input units.

As illustrated in FIG. 2A and FIG. 2B, in the present embodiment, for example, the third video input unit 125 and the display 121 are arranged on the same surface (front surface). The first video input unit 123 and the second video input unit 124 are arranged on a surface opposite to the display 121 (back surface). Additionally, a flash unit 129 is arranged on a position adjacent to the first video input unit 123 and the second video input unit 124.

In the following, there will be cases where the third video input unit 125 disposed on the same surface on which the display 121 is disposed is referred to as an "in-camera", and the first video input unit 123 and the second video input unit 124 disposed on the surface opposite to the surface on which the display 121 is disposed are referred as an "out-camera". In the present embodiment, the first video input unit 123 and the second video input unit 124 are arranged on the positions of the back surface, on the other hand, they may be arranged on the same surface on which the display 121 is disposed. Furthermore, the first video input unit 123 and the second video input unit 124 may be configured as one unit.

The voice processor 130 includes a voice output unit 131, a voice signal processor 132, and a voice input unit 133. The voice output unit 131 is a speaker, and outputs a voice signal processed by the voice signal processor 132 to the outside. The voice input unit 133 is a microphone, and converts voice of a user into voice data and inputs the data. The voice input unit 133 is separate from the information processing terminal 100, and may be connected to the information processing terminal 100 by wire communication or wireless communication.

The operation unit 140 is an instruction input unit for inputting an operation instruction to the information processing terminal 100. In the present embodiment, as illustrated in FIG. 2A and FIG. 2B, the operation unit 140 includes a touch panel 140t which is overlapped and arranged on the display 121, and operation keys 140k1, 140k2 which are arranged as button switches. In this connection, only one of among the touch panel 140t and the operation keys 140K1, 140K2 may be used. Furthermore, the information processing terminal 100 may be configured to be operated by using such as a keyboard connected to the extension interface 170 which will be described later. Still further, the information processing terminal 100 may be configured to be operated by using another information processing terminal device connected thereto by wire communication or wireless communication. The touch panel function may be the one which is provided in the display 121.

The communication processor 150 includes a LAN (Local Area Network) transceiver 151, a mobile telephone network transceiver 152, and a proximity wireless transceiver 153. The LAN transceiver 151 is connected with wireless communication access points for the Internet by wireless communication to transmit/receive data. The mobile telephone network transceiver 152 performs telephone communication (telephone call) and transmits/receives data by wireless communication with a base station of a mobile telephone network. The proximity wireless transceiver 153 performs wireless communication in proximity to a reader/writer corresponding thereto. Each of the LAN transceiver 151, the mobile telephone network transceiver 152, and the proximity wireless transceiver 153 includes a coding circuit, a decoding circuit, an antenna, etc., respectively. Additionally, they may include an infrared transceiver, etc.

The sensor 160 is a sensor group for detecting a state of the information processing terminal 100. In the present embodiment, the sensor 160 includes a GPS (Global Positioning System) receiver 161, an acceleration sensor 162, a gyro sensor 163, a geomagnetic sensor 164, an illuminance sensor 165, and a proximity sensor 166. The sensor group makes it possible to detect such as a position, a movement, an inclination, and a direction of the information processing terminal 100 as well as a peripheral brightness and a proximity state of a surrounding object. The sensor 160 may further include other sensors.

The extension interface 170 is an interface group for extending the function of the information processing terminal 100, and in the present embodiment, includes a video/voice interface, a USB (Universal Serial Bus) interface, a memory interface, etc. The video/voice interface inputs a video signal/voice signal from an external video/voice output device and outputs a video signal/voice signal to the external video/voice output device. The USB interface connects a keyboard and other USB devices with the information processing terminal 100. The memory interface connects a memory card and other memory media with the information processing terminal 100 to transmit/receive data.

Figure 3:
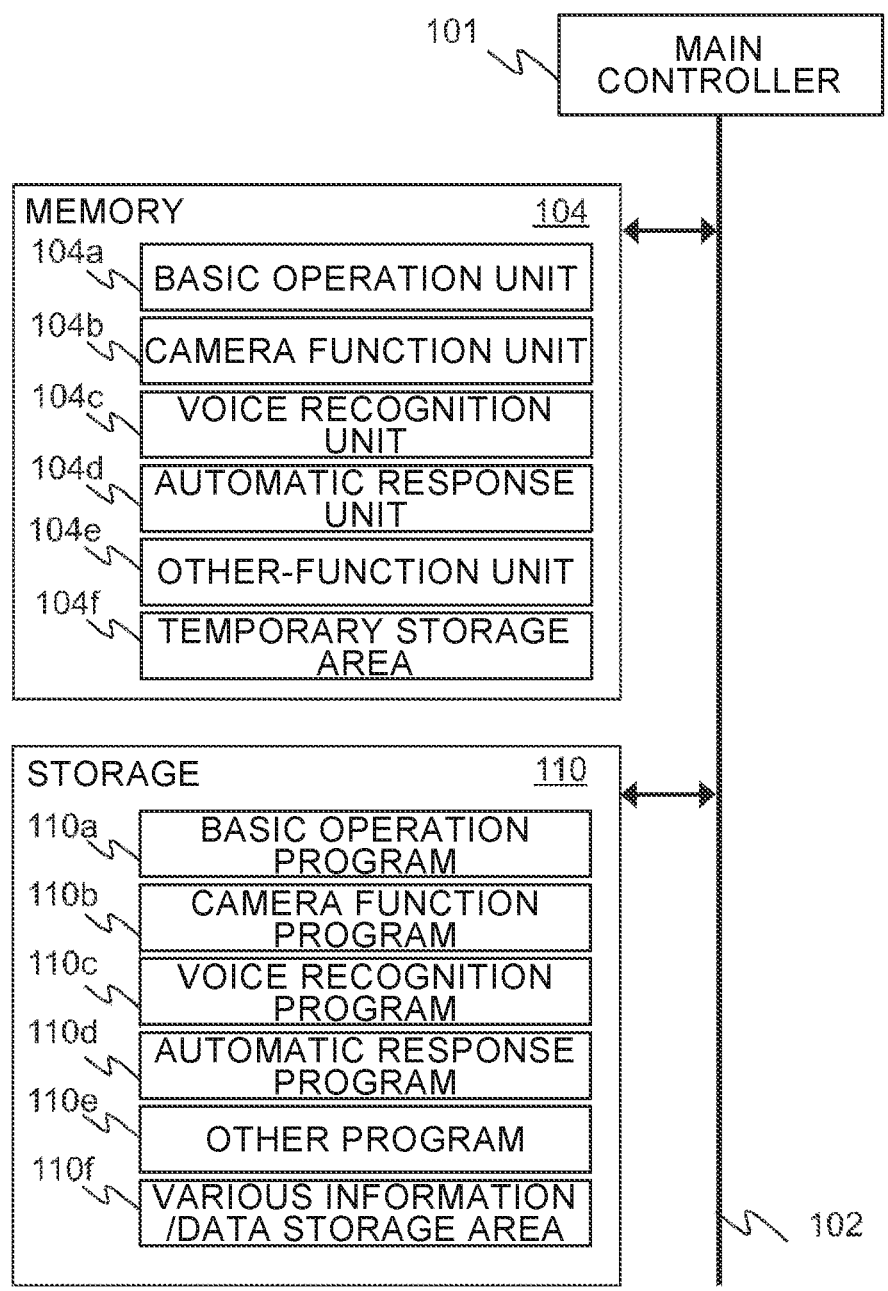
FIG. 3 is a block diagram of a memory and storage of an information processing terminal according to an embodiment of the present invention.

FIG. 3 illustrates a block diagram of a memory 104 and a storage 110 according to the present embodiment.

The main controller 101 develops a basic operation program 110a, a camera function program 110b, and a voice recognition program 110c, an automatic response program 110d, and other programs 110e which are stored in the storage 110 on the memory 104 and executes them, so as to realize a basic operation unit 104a, a camera function unit 104b, a voice recognition unit 104c, an automatic response unit 104d, and other-function units 104e which control operations of the information processing terminal 100.

The information processing terminal 100 may further include each hardware block for realizing the same operations as those of the basic operation unit 104a, the camera function unit 104b, the voice recognition unit 104c, the automatic response unit 104d, and the other-function units 104e in hardware as substitutes therefor.

The storage 110 further includes a storage area 110f for storing various kinds of information and data. The various kinds of information and data are stored in the storage area 110f in advance, and at the time of execution of each program, for example, developed on a temporary storage area 104f of the memory 104 and used. The data generated during execution of each program and data generated as an execution result are stored in the storage area 110f or the temporary storage area 104f.

In the present embodiment, the various kinds of information and data include, for example, personal information, map information, and traffic information. Such information may not be stored in the storage 110, but for example, may be stored in other storages which are accessible through the Internet.

The personal information referred to in the present embodiment is information which is held by the information processing terminal 100 in a broad sense, and is specific to a user or is input in the information processing terminal 100 by the user. Specifically, the personal information includes information such as an address, a telephone number, a date of birth of the user, as well as information of pictures and moving pictures stored in the information processing terminal 100, and also includes such as contact information, authority information, positional information, and schedule information which will be described later.

The configuration example of the information processing terminal 100 illustrated in FIG. 1 includes a number of elements which are not essential to the present embodiment such as a part of the communication processor 150 and a part of the sensor 160, on the other hand, even when these elements are not included in the configuration, an advantageous effect of the present embodiment is not lost. Additionally, elements which are not illustrated in the drawings such as a digital television broadcast receiving function and an electronic money settlement function may be further added to the configuration.

Hereinafter, the automatic response unit 104d according to the present embodiment will be described. FIG. 4 illustrates a functional block diagram of the automatic response unit 104d according to the present embodiment.

The automatic response unit 104d of the present embodiment includes a receiver 210, a processor 220, and a transmitter 240. The automatic response unit 104d of the present embodiment uses various data stored in the storage area 110f of the various information and data or the temporary storage area 104f as a database 250 to realize automatic response processing.

The receiver 210 receives an access and message which are sent from an access partner to the information processing terminal 100. The receiver 210 of the present embodiment includes a text data receiver 211, a voice data receiver 212, and an other-information receiver 213.

The processor 220 creates a response in accordance with a message received by the receiver 210. The processor 220 of the present embodiment includes a character recognition unit 221, a voice recognition unit 222, an intention recognition unit 223, a response creation unit 230, an authority setting unit 225, a response recording unit 226, a terminal controller 227, a text data generation unit 228, a voice data generation unit 229, and a situation grasping unit 224.

The transmitter 240 transmits the response generated by the processor 220 to the access partner. The transmitter 240 therefore includes a text data transmitter 241 and a voice data transmitter 242.

The database 250 stores a personal information DB 254 and a response recording DB 253. The personal information DB 254 includes a contact information database (DB) 251 and an authority information DB 252.

The text data receiver 211 receives text data in the message transmitted from the access partner via the communication processor 150. The text data receiver 211 outputs the received text data to the character recognition unit 221.

The character recognition unit 221 analyzes characters to acquire text data. The text data is, for example, a text message in a text chat and a text in an e-mail.

The voice data receiver 212 receives voice data in the message transmitted from the access partner via the communication processor 150. The voice data receiver 212 outputs the received voice data to the voice recognition unit 222. The voice data receiver 212 transmits the voice data, for example, by telephone using a telephone network, an IP telephone using the internet network, or a telephone available in an application which can be also used as a text chat. In this connection, the data to be transmitted may include video data.

The voice recognition unit 222 recognizes voice to acquire text data. The voice recognition unit 222 is realized by the above-mentioned voice recognition unit 104c.

The other-information receiver 213 receives information accompanied by the message transmitted from the access partner (accompanying information). The accompanying information includes, for example, an incoming number in the case of telephone, an e-mail address of a transmission source in the case of e-mail, an application ID in the case of text chat, which are information capable of uniquely specifying an access partner. In the following, information capable of uniquely specifying an access partner is collectively referred to identification (ID) information. The other-information receiver 213 transmits the received accompanying information to the authority setting unit 225.

The authority setting unit 225 specifies an access partner by using the contact information DB 251 based on the ID information of the access partner. Then, the authority setting unit 225 refers to contents of the message as necessary, determines authority of the access partner by using the authority information DB 252, and sets the authority of the access partner. The details of the contact information DB 251 and the authority information DB 252 and the details of processing of the authority setting unit 225 will be described later.

The intention recognition unit 223 analyzes the data which has been made into texts by the character recognition unit 221 or the voice recognition unit 222 to identify the intention of the data. The intention recognition unit 223 outputs an identification result (intention recognition result) to the response creation unit 230. In the present embodiment, the data is classified into predetermined intention sections. The intention sections include, for example, schedule confirmation (inquiry), location confirmation, and appointment request. The details thereof will be described later. Analysis of data may, for example, utilize a variety of existing techniques such as machine learning.

For example, firstly, the intention recognition unit 223 identifies feature of data. The intention recognition unit 223 identifies the feature based on metadata, location of a part of the data within the data, contents, context, keyword, history, heuristic, inference, rule, division, source of the data, and transmitted/received time/day of the data. Then, the intention recognition unit 223 divides the data of which the feature has been identified into logical structures such as a character string, word, sentence, and paragraph, extracts features of each logical structure, and identifies the intention from the extracted features.

The intention recognition unit 223 may be constituted of a classifier by a Support Vector Machine, a Bayes method, a knowledge engineering, etc. Furthermore, learning data which was previously made to learn may be installed in advance and used. Still further, the learning data may be dynamically updated at the time of execution. The intention recognition unit 223 may employ a method for recognizing an intention by using the technique of machine learning such as deep learning and reinforcement learning.

For example, upon receiving a message such as "where are you?", the intention recognition unit 223 recognizes the intention of the message as "location confirmation" and outputs "current location of the information processing terminal 100" which is a location to be confirmed. Similarly, upon receiving a message such as "what are you doing now?" or "who are you taking with on the phone?", the intention recognition unit 223 outputs "current situation confirmation". Upon receiving a message such as "Can we meet now?", "Do you have time on X day of Y month?", or "Please note that the meeting will be held", the intention recognition unit 223 outputs "appointment request". Upon receiving a message such as "Have you got the pictures from the trip?", the intention recognition unit 223 outputs "request of providing data" as well as "pictures from the trip to XX" which is the information for specifying the data to be provided. In this case, the pictures are selected based on the information which can be acquired from date information and location information accompanied by the pictures or analysis of the images of the pictures, etc. Upon receiving a message such as "What is your pulse rate?", the intention recognition unit 223 outputs "request for providing medical information" as well as "pulse rate" which is the information to be provided. Upon receiving messages such as "Turn on the light" and "Turn on the sound", the intention recognition unit 223 outputs turning on a light, emitting light, outputting a sound, etc. as the request for controlling operations of the information processing terminal 100 and control processing thereof.

Based on the result of intention recognition which has been identified by the intention recognition unit 223 and the authority which has been set by the authority setting unit 225, the response creation unit 230 generates response contents on which the result of intention recognition of the access partner is reflected (including the location information and/or schedule information). The response creation unit 230 outputs the generated response contents to at least one of the text data generation unit 228, the voice data generation unit 229, and the terminal controller 227. The details thereof will be described later.

The response recording unit 226 records the response contents generated by the response creation unit 230 together with the ID information of the access partner in the response recording DB 253. Here, the access partner is a transmission source of the message which is a basis for generating the response contents. In this connection, the recorded response contents may be adapted to be displayed when the user operates the information processing terminal 100 for the first time thereafter or when the user operates an associated application for the first time thereafter in order to show to the user that the automatic response function has been executed.

The response recording unit 226 corresponds the ID information, response contents, recording time, etc. with each other and registers them in the response recording DB 253.

The text data generation unit 228 converts the response contents generated by the response creation unit 230 into text data, and makes the text data transmitter 241 transmit the text data to the access partner according to the access method.

The voice data generation unit 229 converts the response contents generated by the response creation unit 230 into voice data, and makes the voice data transmitter 242 transmit the voice data to the access partner according to the access method.

The terminal controller 227 performs an operation such as outputting a beep sound or lighting the flash unit 129 based on an instruction from the response creation unit 230.

The situation grasping unit 224 determines whether the user can respond to an access, and when it is determined that the user is unable to respond, it performs initial response processing in accordance with the category and/or authority of the access partner. The situation grasping unit 224 determines whether the user can respond to the access depending on whether operations including responding, opening an e-mail, etc. is performed or whether the e-mail has already been read within a prescribed time. The details of the initial response processing will be described later.

Hereinafter, the contact information DB 251 and the authority information DB 252 which are accessed by the authority setting unit 225, the response creation unit 230, the situation grasping unit 224, etc. at the time of processing and stored in the database 250, will be described.

The contact information DB 251 stores attribute (category) information of the access partner by corresponding it to the ID information of the access partner. FIG. 5 illustrates an example of the contact information DB 251.

Each record item registered in the contact information DB 251 includes, as illustrated in FIG. 5, a name 251*a*, a category 251*b*, a date of birth 251*c*, a password 251*d*, and an ID information 251*e* of the access partner.

The category 251*b* is a unit for specifying the authority in the authority information DB 252 which will be described later. In the present embodiment, the category 251*b* includes a belonging 251*f*, an importance flag (importance) 251*g*, and a type 251*h*. The importance flag 251*g* is used to set a plurality of different authority to people in the same type 251*h*. With the importance flag 251*g*, for example, it is possible to set the different authority to the people, even if they belong to the same company, depending on whether the person is a superior.

The information of the user of the information processing terminal 100 is also registered in the contact information DB 251. As the information of the user, information capable of specifying the identity of the user such as "myself" is registered in the type 251*h*.

The ID information 251*e* includes a telephone number 251*i*, an e-mail address 251*j*, and an application ID 251*k*, which are the information for identifying the access partner as described above.

In this connection, in the "emergency" of the category 251*b*, for example, an administration ID is registered as the ID information 251*e*. The administration ID can be used, for example, as a clue for finding a missing person by an administrative organization such as a fire station in the case of disaster. Specifically, the administration may access the information processing terminal 100 of a victim buried in rubble to acquire its positional information and/or specify its position by generating a sound.

The name 251*a* is used for providing the user with the identification information specified by the ID information 251*e* since the name can be understood by the user more easily than a telephone number and an e-mail address. The user merely needs to know who the access partner is, and accordingly, the name 251*a* is not limited to the names of people, but can recite, for example, a company name or school name. In this connection, the names in the name 251*a* may overlap with each other.

Furthermore, information such as a zip code, an address, and pictures may be registered in the contact information DB 251. On the other hand, all the items in the contact information DB 251 are not necessarily filled in but only necessary information may be appropriately recited.

The authority information DB 252 stores propriety of execution processing, which is performed by the information processing terminal 100 in accordance with the message from the access partner, as the authority for each category. FIG. 6 illustrates an example of the authority information DB 252.

Each record registered in the authority information DB 252 includes, as illustrated in FIG. 6, a category 252a and an execution processing propriety information 252b. The category 252a corresponds to the category 251b of the contact information DB 251, and includes a type, a belonging, and an importance flag.

The propriety information 252b is information for specifying whether each execution processing can be performed. The registered execution processing includes, for example, providing positional information, schedule confirmation (providing scheduled information), appointment processing, providing personal information, providing health information, and emergency processing. The execution processing is not limited to the items above, but necessary inquiry contents can be set as the execution processing, and appropriately added thereto or deleted therefrom.

In the present embodiment, a case where the number of the authority information DB 252 is one will be described as an example. However, the reliability of telephone numbers is different from that of e-mail addresses. That is, e-mail addresses are easily camouflaged. Therefore, another different authority information DB 252 may be provided for when the ID information 251e which is the basis for specifying the category 252a is telephone numbers and for when it is e-mail addresses. In this case, the authority in the authority information DB 252 of the e-mail addresses is restricted more than that of the authority information DB 252 of the telephone numbers even for the same category 252a.

The contact information DB 251 and the authority information DB 252 are stored in the storage 110, and appropriately developed on the memory 104 as needed during execution of a program.

Figure 7:
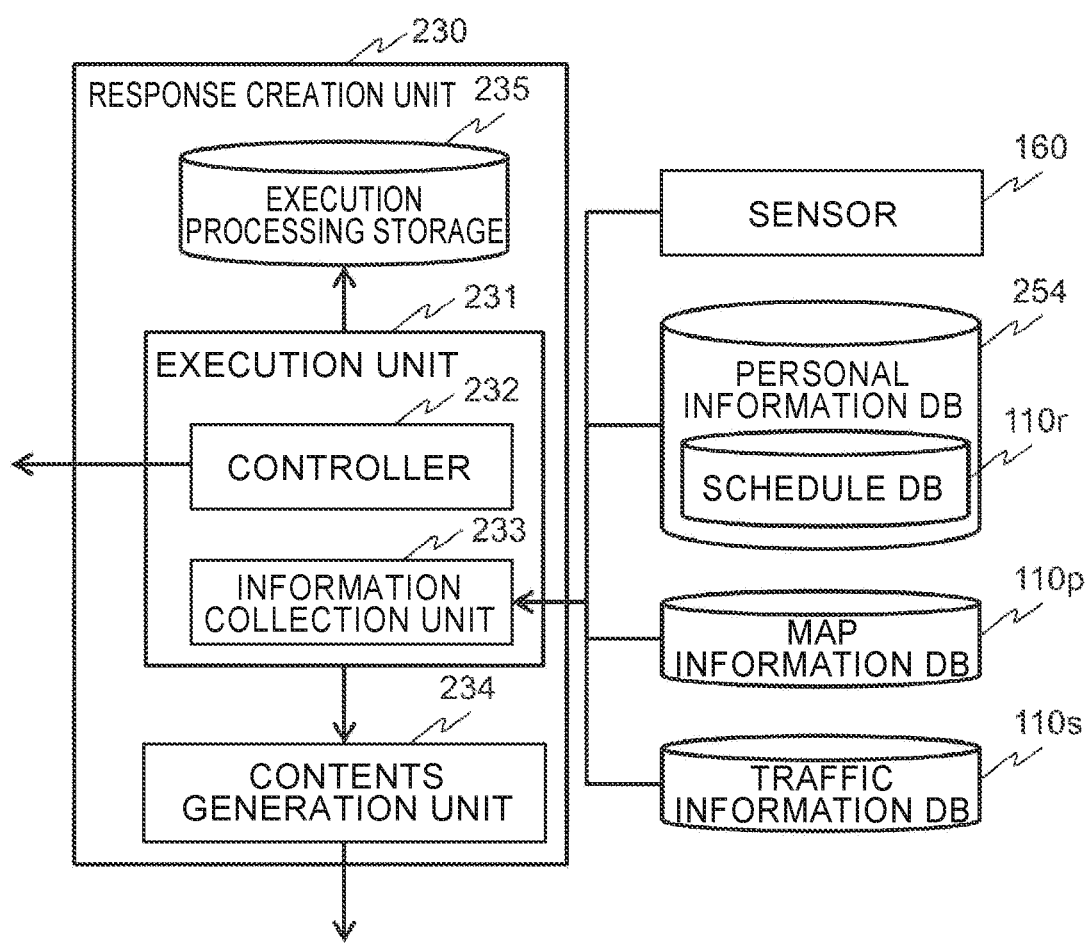
FIG. 7 is a functional block diagram of a response creation unit according to an embodiment of the present invention.

Hereinafter, the details of the response creation unit 230 will be described. FIG. 7 illustrates a functional block diagram of the response creation unit 230. The response creation unit 230 creates response contents by using the intention recognition result and the authority as described above. To realize above, the response creation unit 230 includes an execution processing storage 235 for storing execution processing contents which has been determined in advance for each intention, an execution unit 231 for performing the execution processing, and a contents generation unit 234. The execution unit 231 includes a controller 232 and an information collection unit 233.

The execution processing storage 235 stores the processing to be performed (execution processing) for each intention recognition result. The execution processing is, for example, acquiring positional information from the GPS receiver 161 when the location to be confirmed by the location confirmation is a current position. Even in the case of the location confirmation, when the location to be confirmed is a specific location other than the current position, the execution processing is accessing a map information DB 110p which is held in the storage 110 or on the network and acquiring the positional information of the location.

The execution unit 231 accesses the execution processing storage 235, and performs the execution processing in accordance with the received intention recognition result. As needed during the execution processing, the execution unit 231 makes the controller 232 control the operation of the terminal, and makes the information collection unit 233 collect information.

The controller 232 controls the operations of the information processing terminal 100 in accordance with an instruction from the execution unit 231. Specifically, during the execution processing, when the function for acquiring the positional information is turned off even though the processing for acquiring the positional information is included in the execution processing, the controller 232 temporarily turns on the function. In the present embodiment, for example, the GPS receiver 161 serves as the function for acquiring the positional information.

The information collection unit 233 collects information in accordance with an instruction from the execution unit 231 when it is necessary to collect various information during the execution processing.

The information collection unit 233, for example, acquires the latitude/longitude information from the information acquired by the GPS receiver 161 of the sensor 160 to specify the position. Next, the information collection unit 233 searches the map information DB 110p held in the storage 110, etc. to acquire such as an address, a facility name, and a building name which serve as a landmark of the current position.

In this connection, acquisition of the positional information can be performed not only from the GPS but also via the communication processor (specifically, via Wi-Fi, mobile communication network, etc.) 150. Furthermore, specification of the position may be performed based on the positional information of the access points which are the communication destination of the communication processor 150.

The information collection unit 233 acquires such as personal information, pictures, and moving pictures in the information processing terminal 100 from the personal information DB 254. Likewise, the information collection unit 233 may acquire such as an address, a telephone number, an e-mail address, and an application ID of each person registered in the contact information DB 251 therefrom. In this connection, when each application has the respective application IDs, the information collection unit 233 acquires them from each application by referring to the contact information DB 251 as needed.

Furthermore, the information collection unit 233 may acquire schedule information of the user of the information processing terminal 100 from a schedule DB 110r in the personal information DB 254. The schedule information includes time information and location information.

The execution unit 231 may temporarily set new schedule information in the schedule DB 110r when it is determined that the appointment can be made as a result of the execution processing.

The information collection unit 233 may access a traffic information DB 110s to collect information. The execution unit 231, for example, calculates an expected time required for travelling between the departure place and the arrival place by using the information collected by the information collection unit 233. In addition, the information collection unit 233 may acquire the expected time required for travelling from the departure place to arrival place directly from the traffic information DB 110s for each of walking, train, bus, and car (taxi).

The traffic information DB 110s may be stored in the inside of the information processing terminal 100, or may be held on a server on the Internet via the communication processor 150. In this connection, calculation of the travelling time by train may take account of delay information, and the calculation of the travelling time by bus and/or car (taxi) may take account of traffic congestion information of the road (current or prediction). For example, when a plurality of routes can be considered, there is a possibility that the priority of the shortest route is lowered due to influence of the delay.

The information collection unit 233 may acquire the surrounding conditions of the information processing terminal 100 as image or voice information via the video processor 120 and the voice processor 130.

The contents generation unit 234 generates response contents by using the execution result by the execution unit 231. Thereby, the response creation unit 230 acquires the information in accordance with the intention of the access partner from the information collection unit 233, to generate the response contents including such information.

Hereinafter, a flow of the automatic response processing performed by the automatic response unit 104d of the present embodiment will be described. As illustrated in FIG. 3, mainly, the voice recognition program 110c and the automatic response program 110d stored in the storage 110 are developed on the memory 104 and executed by the main controller 101, and thereby the processing of the automatic response unit 104d is realized.

Figure 8:
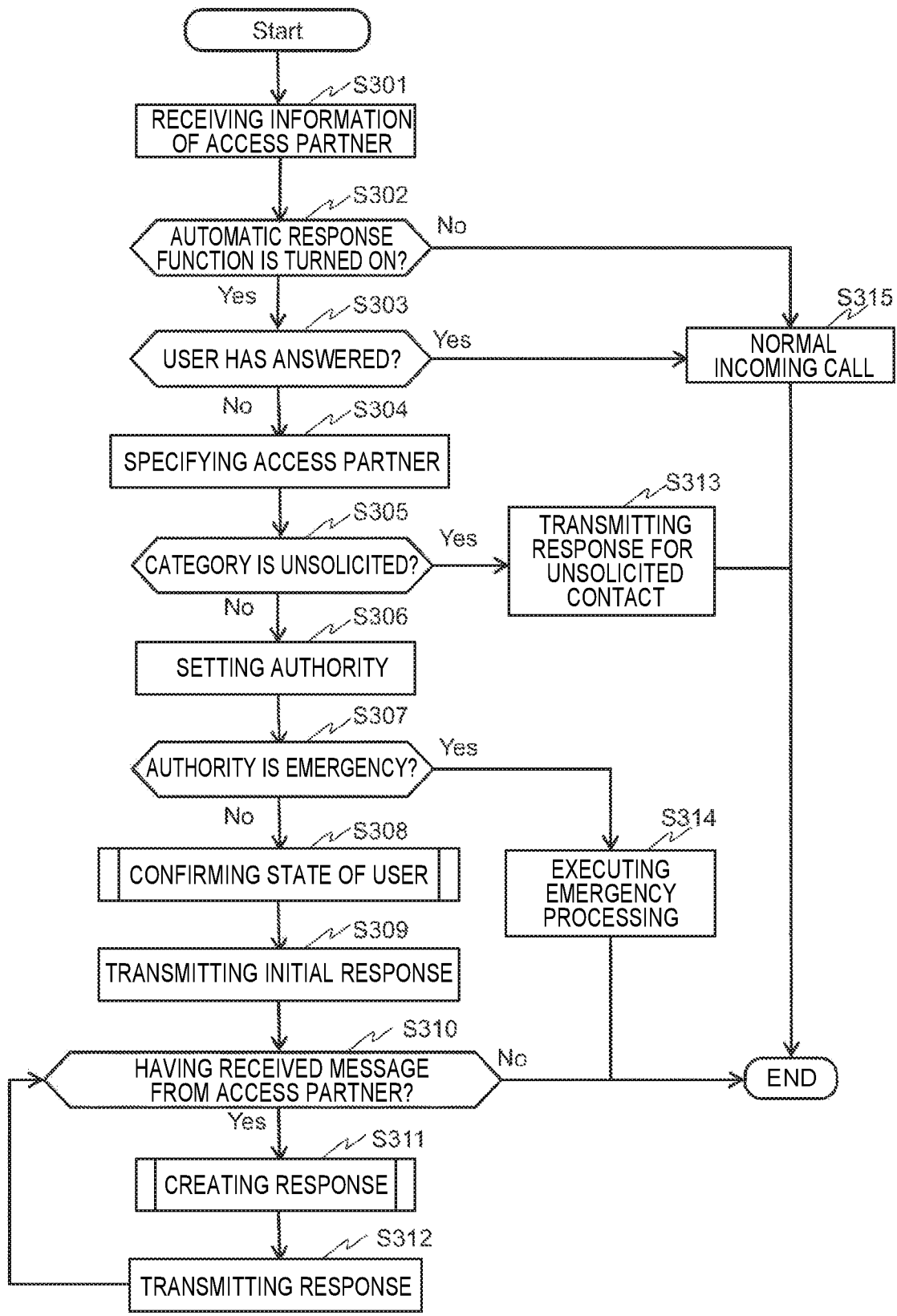
FIG. 8 is a main flowchart of automatic response processing according to an embodiment of the present invention.

FIG. 8 illustrates a main flowchart of automatic response processing of the information processing terminal 100. In the following, the automatic response in the case of telephone will be described as an example, and reference to some operations of the processing in the case of e-mail and text chat, which are similar to those of the processing in the case of telephone, will be omitted. Meanwhile, characteristic points in the omitted cases will be referred to as needed.

Firstly, upon receiving the first telephone call from the access partner, the situation grasping unit 224 acquires a telephone number (ID) of the access partner (S301).

Then, the situation grasping unit 224 determines whether the automatic response function is turned on (S302). When the automatic response function is turned off, the situation grasping unit 224 performs an operation similar to the case of a normal incoming call (S315). In this case, when the user cannot respond to the incoming call but has set the automatic answering telephone function, the automatic answering telephone function will be operated.

When the automatic response function is turned on, the situation grasping unit 224 determines whether the user can respond to the access (S303). Determination above by the situation grasping unit 224 is made, for example, by whether a telephone call is answered, an e-mail is opened, or a message in a text chat is read within a certain period of time.

When the automatic response function is turned on and the user can respond to the access, the situation grasping unit 224 also proceeds the processing to S315, performs the operation similar to the case of a normal incoming call (S315), and finishes the automatic response function.

When the user cannot respond to the access, the situation grasping unit 224 specifies who the access partner is (S304). The specification of the access partner is performed by using the acquired ID of the access partner and the contact information DB 251. When the acquired ID is not registered in the contact information DB 251 and specification of the access partner cannot be performed, the situation grasping unit 224 proceeds the processing to S305 while rendering the type 251h as "unknown".

Next, the situation grasping unit 224 refers to the contact information DB 251 to determine whether the type 251h of the access partner is "unsolicited" (S305). When it is determined that the category type of the access partner is "unsolicited", the situation grasping unit 224 transmits a response for unsolicited contact (S313), and finishes the processing.

The processing above makes it possible for the user to finish the contact with the access partner who is considered as an unsolicited person by the user without performing subsequent processing when the user registers the telephone number of the unsolicited person in the contact information DB 251. Here, an access partner who is considered as an unsolicited person by the user may not necessarily be registered in the contact information DB 251. For example, an ID of an access partner who is considered as an unsolicited person by the user may be stored on the server. In this case, the situation grasping unit 224 acquires the ID thereof via the communication processor 150. Furthermore, the situation grasping unit 224 may determine an access partner who accesses the information processing terminal 100 with a certain frequency within a certain period of time as an unsolicited person, and automatically sets such an access partner in the contact information DB 251. The case above is, for example, for a crank call.

Next, the situation grasping unit 224 refers to the contact information DB 251 and the authority information DB 252 to specify the authority of the access partner (S306).

Then, the situation grasping unit 224 determines whether the specified authority of the access partner (category 252a) is "emergency" (S307). When it is determined that the authority of the access partner (category 252a) is "emergency", the situation grasping unit 224 executes the emergency processing (S314), and finishes the processing.

Here, for example, a case where the user suffers from the disaster is assumed. The situation grasping unit 224 performs, as an operation of the emergency processing, such as generating a beep sound, turning on a light or a emitting light, transmitting positional information (by turning on the positional information function when it is turned off), or activating a camera to transmit a still picture or a moving picture. In the case of emergency processing, the situation grasping unit 224 may request the access partner to input a dedicated password to confirm whether the access partner is the one who has the authority to perform the emergency processing.

Next, the situation grasping unit 224 confirms a state (S308). The state to be confirmed is a state of the user. Specifically, for example, information for specifying the state of the user (state information) such as during moving, talking on the phone, viewing a moving picture, or playing a game is output as a confirmation result. The details will be described later with reference to FIG. 9.

Then, the situation grasping unit 224 transmits an initial response in accordance with the state confirmed in S308 via the text data generation unit 228 or the voice data generation unit 229 (S309). The initial response may include, in accordance with the authority of the access partner, a request to transmit a message.

The initial response may be the one which is provided in the first person by the automatic response unit 104d, for example, "The user cannot respond to your contact now. Please tell me your message so I am going to help you in place of the user". Furthermore, the authority information DB 252 may additionally include a list of "reasons of absence". When the access partner has the authority to be notified of the "reasons of absence", the situation grasping unit 224 may add the state information confirmed in S308 to the initial response as the reason of absence. In this case, for example, the initial response says "The user is engaged with another call and cannot answer your contact now" instead of "The user cannot respond to your contact now".

Next, the processer 220 determines, after transmission of the initial response, whether the receiver 210 received a message from the access partner in response to the initial response within a certain period of time (S310). In this connection, the processer 220 may set another certain period of time which is shorter than the certain period of time used for determining whether the receiver 210 has received a message from the access partner, and doubly determine such as, when the access partner makes contact via an e-mail, whether the e-mail of the initial response has been opened, and when the access partner makes contact via a text chat, whether the message of the initial response has been read.

Upon receiving a message from the access partner, the processer 220 performs response generation processing to generate a response according to the contents/purpose of the message (S311). The details will be described later.

Next, the transmitter 240 transmits the contents generated in S311 to the access partner who is the transmission source (S312). Then, the transmitter 240 returns the processing to S310, and the automatic response function continues to correspond with the access partner until no message arrives from the access partner. When the user becomes ready to respond to the access during the execution of the operation in the flowchart, the automatic response function stops the operation in the middle and switches the response to the user.

Figure 9:
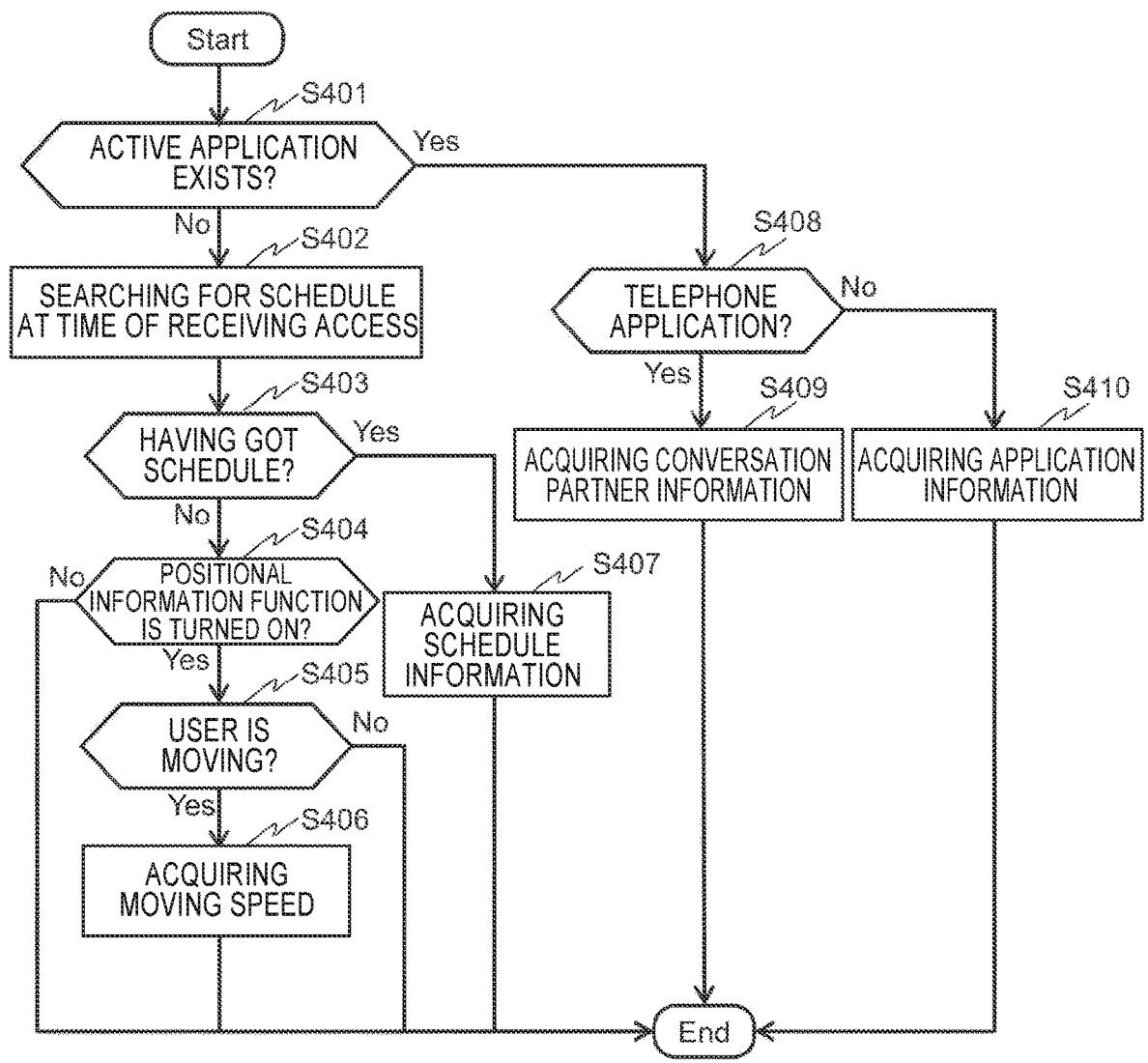
FIG. 9 is a flowchart of situation confirmation processing according to an embodiment of the present invention.

Hereinafter, the details of the state confirmation processing performed by the situation grasping unit 224 in S308 will be described. FIG. 9 illustrates a flowchart of the state confirmation processing.

Firstly, the situation grasping unit 224 determines whether there is an active application (S401). When it is determined that there is no active application, the situation grasping unit 224 searches for whether the user has a schedule at the time of being accessed (S402).

When the schedule is found, the situation grasping unit 224 accesses the schedule DB 110r to acquire schedule information (S407), and finishes the processing. At this time, the schedule information is output as state information.

On the other hand, when no schedule is found in S403, the situation grasping unit 224 determines whether the positional information function is turned on (S404), and when it is turned off, finishes the processing without being capable of confirming the state of the user. When the state of the user cannot be confirmed, information indicating such as unknown is output, or nothing may be output.

When the positional information function is turned on in S404, the situation grasping unit 224 determines whether the user is moving (S405). Specifically, the situation grasping unit 224 acquires the positional information to determine whether the user is moving based on changes in the positional information. When the user is not moving, the situation grasping unit 224 finishes the processing without being capable of confirming the state of the user.

On the other hand, when the user is moving, the situation grasping unit 224 acquires the moving speed (S406), and finishes the processing. In this case, information indicating that the user is moving is output as the state information. In S406, a threshold may be provided for the moving speed to further determine whether the user is moving at high speed. In addition, the situation grasping unit 224 may refer to the map information, etc. together with the moving speed to assume the specific moving means such as on foot, by bicycle, car, or train. The determined result and assumed result may be output together with the state information.

Next, when it is determined in S401 that there is an active application, the situation grasping unit 224 determines whether it is a telephone application (S408). If the telephone application is active, the situation grasping unit 224 acquires information of a conversation partner (S409), and finishes the processing. In this case, information indicating that the user is talking on the phone with the conversation partner is output as the state information.

On the other hand, when the active application is not a telephone application, the situation grasping unit 224 acquires information of the application (S410), and finishes the processing. In this case, information indicating that the application is in use is output as the state information.

The reason for searching for an active application is, for example, there is a possibility that the user does not answer an incoming call while viewing a moving picture or playing a game. In such a situation, when someone accesses the information processing terminal 100 via an e-mail or a text chat, there is also a possibility that the user cannot even notice that someone has accesses to his/her information processing terminal 100.

Figure 10:
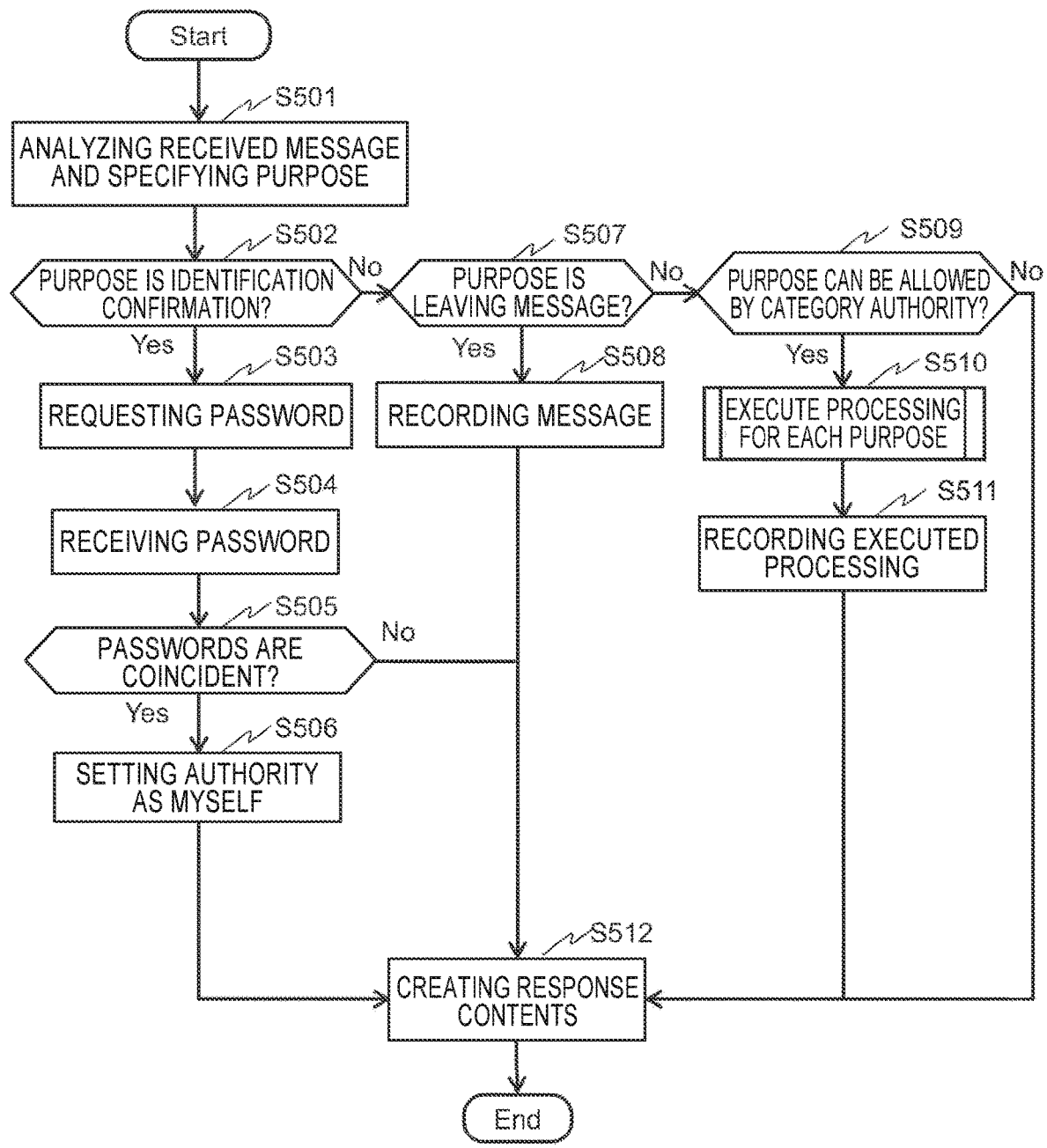
FIG. 10 illustrates a flowchart of response creation processing according to an embodiment of the present invention.

Hereinafter, the details of the response generation processing in step S311 will be described. FIG. 10 illustrates a flowchart of the response generation processing in S311

Firstly, the intention recognition unit 223 analyzes a message received from the access partner to specify the access partner's intention to access the information processing terminal 100, that is, purpose of the access (S501).

Then, the response creation unit 230 determines whether the purpose of the access is identification confirmation (S502). Originally, the information processing terminal 100 is owned by the user himself/herself. Accordingly, there are basically few cases that the information processing terminal 100 receives an access from the user himself/herself. However, in a case where the information processing terminal 100 is such as a portable smart phone, there is a possibility that the user loses the occupancy of the information processing terminal 100 due to lost or theft thereof. In such a case, the user himself/herself needs to access the information processing terminal 100 to confirm the location of his/her information processing terminal 100 (smart phone) which has been lost. An access from a user himself/herself assumes such the case above.

When the purpose of the access is identification confirmation, the response creation unit 230 requests the user to input a password to confirm that the access partner is the user himself/herself (S503). After receiving the password (S504) and confirming that the input password coincides with the password 251d in the contact information DB 251 (S505), the response creation unit 230 sets the authority of the access partner as "myself" (the user of the information processing terminal 100) (S506). Then, the response creation unit 230 creates response contents in accordance with the purpose (identification confirmation) and the authority (S512), and finishes the processing.

When the purpose of the access is not identification confirmation in S502, the response creation unit 230 determines whether the purpose of the access is leaving a message (S507). When it is determined that the purpose is leaving a message, the response creation unit 230 records the message from the access partner (S508), creates response contents in accordance therewith (S512), and finishes the processing.

When the purpose of the access is other than the above, the response creation unit 230 determines whether a response can be made within the authority of the access partner (S509). When it is determined that a response can be made within the authority of the access partner, the response creation unit 230 refers to the execution processing storage 235 to execute processing in accordance with the purpose of the access (S510). In this connection, specific examples of the processing to be executed will be described later.

Thereafter, the response recording unit 226 records the executed processing in the response recording DB 253 (S511). The response creation unit 230 generates response contents by using the execution result (S512), and finishes the processing.

When a response cannot be made within the authority of the access partner, the response creation unit 230 generates a message indicating that it is not possible to respond to the access from the access partner (S512), and finishes the processing.

Figure 11:
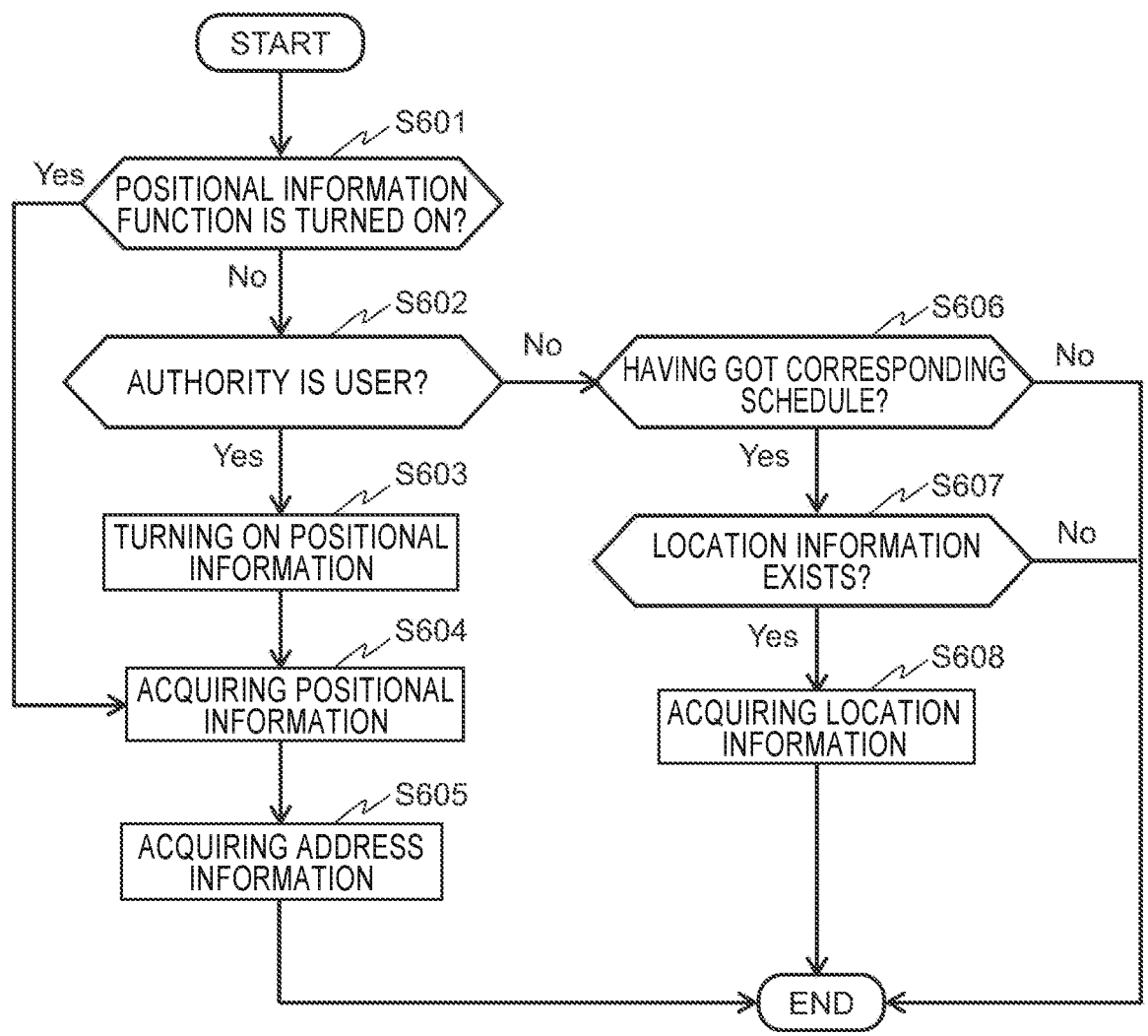
FIG. 11 is a flowchart of an example of execution processing according to an embodiment of the present invention.

Hereinafter, specific examples of the execution processing along the purpose in S510 which is performed by the response creation unit 230 will be described. FIG. 11 illustrates an example of a flowchart indicating the details of S510. Here, a case where the intention recognition result by the intention recognition unit 223 is location confirmation is illustrated as an example. For instance, a case where a message from the access partner includes an expression to request to obtain the positional information of the user such as "Where are you?" will be described.

Firstly, the execution unit 231 determines whether the positional information function of the information processing terminal 100 is turned on (S601). When the positional information function is turned on, the information collection unit 233 acquires positional information (S604). Then, the information collection unit 233 acquires address information from the acquired positional information (S605), and outputs the acquired address information as a processing result. The information collection unit 233 acquires the address information by referring to the map information DB 110$p$. The address information includes not only a specific address but also may include a building name and/or a place name.

On the other hand, when the positional information function is turned off in S601, the execution unit 231 confirms whether the authority is the user himself/herself (the user of the information processing terminal 100) (S602). If the authority is the user himself/herself, the controller 232 turns on the positional information function (S603). This is because, as described above, the purpose of searching for a smart phone which the user himself/herself has lost is considered. It is desirable that, after acquiring the positional information, the controller 232 turns off the position information function for subsequent automatic responses.

When the authority is not the user himself/herself in S602, that is, when the positional information function is turned off and the authority is not the user himself/herself, the execution unit 231 refers to the schedule DB 110$r$ to determine whether the schedule of the user is registered at the time when the access partner accessed the information processing terminal 100 (S606). When the schedule is registered, the execution unit 231 refers to the schedule DB 110$r$ to determine whether location information is included in the registered schedule (S607). When the location information is included therein, the information collection unit 233 acquires the location information (S608) and outputs the location information as a processing result (positional information).

On the other hand, if the schedule is not registered in S606 and the location information is not included in the schedule in S607, the execution unit 231 renders that it is not possible to acquire the positional information, outputs the above as a processing result, and finishes the processing.

The processing above is described by giving an example of the case in which, when the execution unit 231 cannot acquire the positional information by means of the positional information function, it proceeds the processing in order of searching for the schedule information corresponding thereto in the schedule DB 110$r$, and then acquiring the location information as the positional information. Meanwhile, it may be possible to reverse the order above.

Furthermore, the execution unit 231 may acquire the positional information by only one of the means in accordance with the authority of the access partner. The positional information is information which cannot be changed by the user of the information processing terminal 100. On the other hand, the location information included in the schedule DB 110$r$ can be changed by the user. In this way, they are different in nature with each other. It can be said that the information acquired by the positional information function is information to be handled more carefully. For example, it can be assumed that, when the type 251$h$ is a family or a friend, the positional information acquired by the positional information function is notified to the access partner while when the type 251$h$ is a company, the positional information acquired by the positional information function is not notified thereto.

Figure 12:
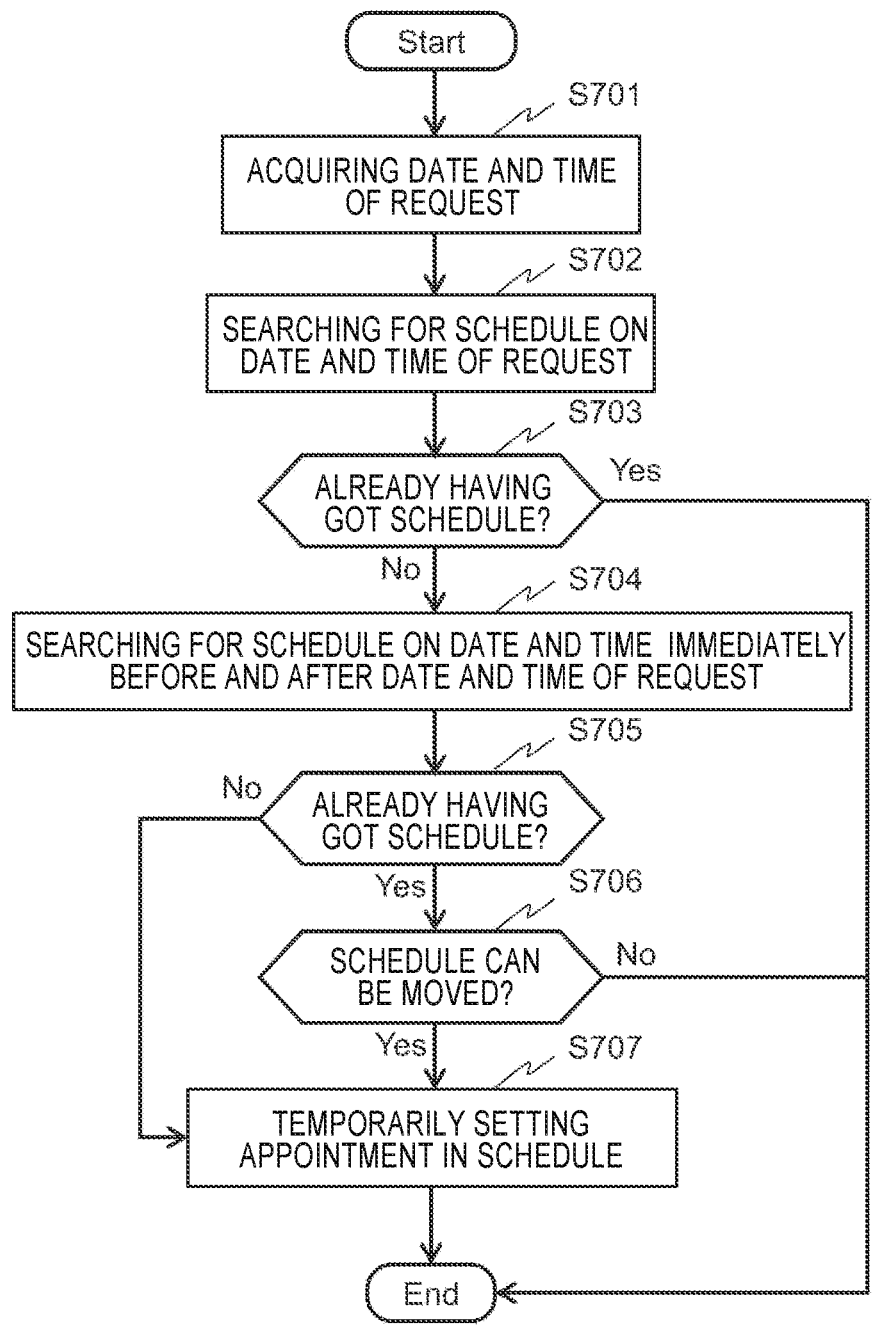
FIG. 12 is a flowchart of another example of execution processing according to an embodiment of the present invention.

Hereinafter, another specific example of the execution processing along the purpose in S510 will be described. FIG. 12 illustrates an example of a flowchart indicating the details of S510. Here, a case where the intention recognition result by the intention recognition unit 223 is appointment request is illustrated as an example. For example, a case where a message from the access partner includes an expression to request to obtain the schedule information of the user such as "Can we meet now?" will be described.

Firstly, the execution unit 231 acquires a date and time, and a location which the access partner requests to know (S701). The execution unit 231 extracts such information from an analysis result by the intention recognition unit 223. Note that the location information is not necessarily required. Meanwhile, if the location information can be acquired, it is possible to perform response operations more accurately. The location information may also be acquired via the other-information receiver 213. For example, when both the user and the access partner recognize with each other that they are within the walking distance, it is considered that the access partner acquires the positional information from the smart phone (information processing terminal 100) of the user. Additionally, when the information processing terminal 100 stores the positional information of the access partner, the positional information of the access partner may be used as the information of the location of request.

Next, the execution unit 231 searches for the schedule on the date and time of request (S702). In this case, the execution unit 231 refers to the schedule DB 110$r$ to extract data of the date and time of request.

Then, the execution unit 231 confirms whether the schedule is already registered on the date and time of request (S703), and when it is confirmed that the schedule is registered, finishes the processing.

On the other hand, when it is confirmed that the schedule is not registered, the execution unit 231 searches for the schedule immediately before and after the date and time of request (S704) to confirm whether the schedule immediately before and after the date and time of request is registered (S705). When the schedule is not registered, the execution unit 231 temporarily sets an appointment in the schedule DB 110$r$ (S707), and finishes the processing. At the time of temporarily setting an appointment, the execution unit 231 adds and registers new schedule information on the date and time of request in the schedule DB 110$r$. In this connection, as to whether the user has a schedule immediately before and after the date and time of request, the user can appropriately set its range, namely, within the day or from the day before and after the requested data.

When the schedule is registered on the date and time immediately before or after the date and time of request, the execution unit 231 also refers to the location information to determine whether the schedule can be moved (S706). For example, the execution unit 231 makes the information collection unit 233 acquire the positional information, the location information of the location of request, the traffic information on the area between the two locations, etc., of the date and time immediately before or after the date and time of request from the map information DB 110p, the traffic information DB 110s, etc. The execution unit 231 determines whether the user can move to the destination within the time.

Then, the execution unit 231 finishes the processing when it is determined that the user cannot move to the destination within the time. On the other hand, the execution unit 231 proceeds the processing to S707 when it is determined that the user can move to the destination within the time.

Upon completion of the processing in S510, if having temporarily set the appointment in the schedule, the execution unit 231 reflects the contents of the appointment on creation of the response contents while if not having temporarily set the appointment in the schedule, the execution unit 231 reflects the contents above on creation of the response contents. Note that even if the schedule is registered on the date and time immediately before or after the date and time of request, when the location information is not registered, the execution unit 231 cannot determine whether the user can move to the destination within the time in S706. Therefore, in this case as well, the execution unit 231 determines that the user cannot move to the destination within the time.

In this connection, still another example of the execution processing in S510 is transmission of data stored in the information processing terminal 100 such as a still picture, a moving picture, and a document. For example, when the access partner is a family member or a friend, the information processing terminal 100 transmits thereto a still picture or moving picture from the trip. When the access partner is a colleague or superior of the company, the information processing terminal 100 transmits thereto a necessary document.

A further example of the execution processing in S510 is transmission of health information of the user. For example, the information processing terminal 100 acquires health information (biological information such as pulse and blood pressure) in coordination with a wearable device for acquiring biological information, etc. For example in home care, even when the user is sleeping and cannot respond to an access, a doctor and/or nurse can periodically grasp the health condition of the user, which makes it possible to quickly find the occurrence of emergency.

As described above, according to the present embodiment, an information processing terminal 100 that performs automatic response, comprises: the database 250 configured to store personal information of a user of the information processing terminal 100; the receiver 210 configured to receive an access and a message from an access partner; the automatic response unit 104d (processor 220) configured to, after receiving the access, perform a request to the access partner to transmit the message when an operation in response to the access is not input in the information processing terminal 100, and create a response to the message which has been received in response to the request; and the transmitter 240 configured to transmit the response to the access partner. Furthermore, the automatic response unit 104d includes: the intention recognition unit 223 configured to recognize an intention of the message; and the response creation unit 230 configured to refer to the intention of the message and the personal information to create a response to the message.

Therefore, according to the present embodiment, when the information processing terminal 100 receives an access, even if the user does not or cannot react to the access, the information processing terminal 100 autonomously creates response contents and returns a response to an access source by taking account of the contents of the access and a situation of the information processing terminal 100. With this configuration, the information processing terminal 100 does not require the user to perform complicated processing. Therefore, according to the present embodiment, it is possible to perform an optimum response operation in accordance with the contents of the access without performing complicated procedure.

Furthermore, according to the present embodiment, the receiver 210 further receives an ID of the access partner, and the database 250 further may store the contact information DB 251 that stores a category of the access partner by corresponding it to the ID information of the access partner and the authority information DB 252 that stores propriety of execution processing, which is performed by the information processing terminal 100 in accordance with the message from the access partner, as authority for each category. Still further, the response creation unit (processer 220) further may perform the execution processing to create a response in accordance with the message by referring to the ID of the access partner, the contact information DB 251, and the authority information DB 252.

With this configuration, according to the present embodiment, response contents are automatically changed in accordance with access sources. That is, even when receiving the same messages, the information processing terminal 100 performs response operations in accordance with attributes of access sources, respectively. Therefore, according to the present embodiment, it is possible to perform more optimum response operations without increasing a burden imposed on a user.

The embodiment above is described under the presumption that the information processing terminal 100 holds a program for realizing automatic response processing. On the other hand, the present invention is not limited to the present embodiment. For example, the program may be introduced to an external storage of the information processing terminal 100 as necessary, via for example, a removable storage medium, communication medium (such as a wired, wireless, or optical network, a carrier wave, and digital signals on the network).

REFERENCE SIGNS LIST

100: information processing terminal
101: main controller
102: system bus
104: memory
104a: basic operation unit
104b: camera function unit
104c: voice recognition unit
104d: automatic response unit
104e: other-function unit
104f: temporary storage area 110: storage
110a: basic operation program
110b: camera function program
110c: voice recognition program
110d: automatic response program
110e: other program
110f: various information/data storage area
120: video processor
121: display
122: video signal processor
123: first video input unit
124: second video input unit
125: third video input unit
129: flash unit
130: voice processor
131: voice output unit
132: voice signal processor
133: voice input unit
140: operation unit
140k1: operation key
140k2: operation key
140t: touch panel
150: communication processor
151: LAN transceiver
152: mobile telephone network transceiver
153: proximity wireless transceiver
160: sensor
161: GPS receiver
162: acceleration sensor
163: gyro sensor
164: geomagnetic sensor
165: illuminance sensor
166: proximity sensor
170: extension interface
210: receiver
211: text data receiver
212: voice data receiver
213: other-information receiver
220: processer
221: character recognition unit
222: voice recognition unit
223: intention recognition unit
224: situation grasping unit
225: authority setting unit
226: response recording unit
227: terminal controller
228: text data generation unit
229: voice data generation unit
230: response creation unit
231: execution unit
232: controller
233: information collection unit
234: contents generation unit
235: execution processing storage
240: transmitter
241: text data transmitter
242: voice data transmitter
250: database
251a: name
251b: category
251c: birth date
251d: password
251e: ID information
251f: belonging
251g: importance flag
251h: type
251i: telephone number
251j: e-mail address
251k: application ID
252a: category
252b: propriety information
110p: map information DB
110r: schedule DB
110s: traffic information DB
251: contact information DB
252: authority information DB
253: response recording DB
254: personal information DB

The invention claimed is:

1. An information processing terminal for preparing and implementing an automatic response, the information processing terminal comprising:
a memory storing personal information of a user of the information processing terminal and an application program; and
at least one microprocessor programmed to:
receive an access request from an access partner;
in response to the received access request, perform a request to the access partner to transmit a message when an operation in response to the access request is not input in the information processing terminal;
make a determination whether an application is actively running on the information processing terminal and is operated by the user when the access request is received;
identify an intention of the message upon receiving the message which has been received in response to the request;
generate the automatic response based on the intention of the message, the personal information, and the determination, the automatic response including information about whether the application is actively running on the information processing terminal and is operated by the user when the access request is received; and
transmit the automatic response to the access partner,
wherein
the automatic response includes a state of the user, and
the state of the user includes identifying that the user is:
(i) playing a game, (ii) watching a video, or (iii) making a telephone call.

2. The information processing terminal according to claim 1, wherein a type of the application includes a game application, a video player application, or a telephone call application.

3. The information processing terminal according to claim 1, wherein the message and the automatic response are transmitted and received via telephone, E-mail or text chat.

4. The information processing terminal according to claim 1, furthermore comprising
a Global Positioning System (GPS) sensor or wireless interface configured to acquire positional information of the information processing terminal, wherein:
the personal information includes the positional information of the information processing terminal,
the automatic response includes the positional information of the information processing terminal, and
the at least one microprocessor acquires the positional information of the information processing terminal after turning on the GPS sensor or wireless interface when the positional information acquisition is turned off, and turns off the GPS sensor or wireless interface after acquiring the positional information.

5. A method for preparing and implementing an automatic response for an information processing terminal of a user, the method comprising:
- receiving an access request in the information processing terminal from an access partner;
- performing a request to the access partner to transmit a message when an operation in response to the access is not input in the information processing terminal;
- executing an application program stored in memory of the information processing terminal;
- making a determination whether an application is actively running on the information processing terminal and is operated by the user when the access request is received;
- identifying an intention of the message upon receiving the message which has been received in response to the request;
- generating the automatic response based on the intention of the message, personal information of the user stored in the memory, and the determination, the automatic response including information about whether the application is actively running on the information processing terminal and is operated by the user when the access request is received; and
- transmitting the automatic response to the access partner, wherein
- the automatic response includes a state of the user, and
- the state of the user includes identifying that the user is: (i) playing a game, (ii) watching a video, or (iii) making a telephone call.

6. The method according to claim 5, wherein a type of the application includes a game application, a video player application, or a telephone call application.

7. The method according to claim 5, wherein the message and the response are transmitted and received via telephone, E-mail or text chat.

8. The method according to claim 5, further comprising:
- acquiring, by a Global Positioning System (GPS) sensor or wireless interface, positional information of the information processing terminal;
- turning on the GPS sensor or wireless interface when acquiring the positional information when the GPS sensor or wireless interface is turned off; and
- turning off the GPS sensor or wireless interface after turning on the GPS sensor or wireless interface and acquiring the positional information; wherein:
- the personal information includes the positional information of the information processing terminal, and
- the automatic response includes the positional information of the information processing terminal.

9. An information processing terminal for preparing and implementing an automatic response, the information processing terminal comprising:
- a memory storing personal information of a user of the information processing terminal and an application program;
- at least one microprocessor programmed to:
  - receive an access request from an access partner;
  - in response to the received access request, perform a request to the access partner to transmit a message when an operation in response to the access request is not input in the information processing terminal;
  - make a determination whether an application is actively running on the information processing terminal and is operated by the user when the access request is received;
  - identify an intention of the message upon receiving the message which has been received in response to the request;
  - generate the automatic response based on the intention of the message, the personal information, and the determination, the automatic response including information about whether the application is actively running on the information processing terminal and is operated by the user when the access request is received; and
  - transmit the automatic response to the access partner; and
- a Global Positioning System (GPS) sensor or wireless interface configured to acquire positional information of the information processing terminal, wherein:
- the personal information includes the positional information of the information processing terminal,
- the automatic response includes the positional information of the information processing terminal, and
- the at least one microprocessor acquires the positional information of the information processing terminal after turning on the GPS sensor or wireless interface when the positional information acquisition is turned off, and turns off the GPS sensor or wireless interface after acquiring the positional information.

10. A method for preparing and implementing an automatic response for an information processing terminal of a user, the method comprising:
- receiving an access request in the information processing terminal from an access partner;
- performing a request to the access partner to transmit a message when an operation in response to the access is not input in the information processing terminal;
- executing an application program stored in memory of the information processing terminal;
- making a determination whether an application is actively running on the information processing terminal and is operated by the user when the access request is received;
- identifying an intention of the message upon receiving the message which has been received in response to the request;
- generating the automatic response based on the intention of the message, personal information of the user stored in the memory, and the determination, the automatic response including information about whether the application is actively running on the information processing terminal and is operated by the user when the access request is received;
- transmitting the automatic response to the access partner;
- acquiring, by a Global Positioning System (GPS) sensor or wireless interface, positional information of the information processing terminal;
- turning on the GPS sensor or wireless interface when acquiring the positional information when the GPS sensor or wireless interface is turned off; and
- turning off the GPS sensor or wireless interface after turning on the GPS sensor or wireless interface and acquiring the positional information; wherein:
- the personal information includes the positional information of the information processing terminal, and
- the automatic response includes the positional information of the information processing terminal.

* * * * *